United States Patent [19]

Fujiwara et al.

[11] Patent Number: 6,137,953
[45] Date of Patent: *Oct. 24, 2000

[54] VIDEO SIGNAL RECORDING APPARATUS IN WHICH NON-ACTIVE DIGITAL VIDEO DATA MAY BE RECORDED IN AN AUXILIARY DATA REGION

[75] Inventors: Yuji Fujiwara, Nishinomiya; Masakazu Nishino, Kashiwara; Tatsuro Juri, Osaka, all of Japan

[73] Assignee: Matsushita Electric Industrial Co., Ltd., Kadoma, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/649,088

[22] Filed: May 17, 1996

[30] Foreign Application Priority Data

May 23, 1995 [JP] Japan .................................. 7-123396

[51] Int. Cl.⁷ ............................. H04N 5/91; H04N 5/928; H04N 5/917; H04N 7/26
[52] U.S. Cl. ............................................. 386/95; 386/109
[58] Field of Search .................... 386/39, 40, 37, 386/33, 95–104, 107–108, 109, 112, 123, 124

[56] References Cited

U.S. PATENT DOCUMENTS

| | | | |
|---|---|---|---|
| 4,353,098 | 10/1982 | Heinz et al. | 360/9.1 |
| 4,463,387 | 7/1984 | Hashimoto et al. | 358/310 |
| 4,477,844 | 10/1984 | Nakano et al. | 360/8 |
| 5,309,290 | 5/1994 | Sugiyama et al. | 360/32 |
| 5,317,413 | 5/1994 | Yanagihara | 358/335 |
| 5,355,229 | 10/1994 | Arano et al. | 358/343 |
| 5,477,397 | 12/1995 | Naimpally et al. | 360/10.3 |

FOREIGN PATENT DOCUMENTS

| | | |
|---|---|---|
| 0559467 | 9/1993 | European Pat. Off. . |
| 0618725 | 10/1994 | European Pat. Off. . |
| 795525 | 4/1995 | Japan . |

OTHER PUBLICATIONS

European Search Report for Application No. 96108005.8; dated Mar. 7, 1997.

*Primary Examiner*—Douglas W. Olms
*Assistant Examiner*—David R Vincent
*Attorney, Agent, or Firm*—Renner, Otto, Boisselle & Sklar LLP

[57] ABSTRACT

According to the present invention, a video signal recording apparatus for recording a digital video signal on a plurality of tracks on a magnetic medium is provided. Each of the tracks has a video data region and an auxiliary data region. In the video signal recording apparatus, the digital video signal is recorded on at least a part of the auxiliary data region.

10 Claims, 5 Drawing Sheets

VIDEO SIGNAL RECORDING APPARATUS IN WHICH NON-ACTIVE DIGITAL VIDEO DATA MAY BE RECORDED IN AN AUXILIARY DATA REGION

BACKGROUND OF THE INVENTION

1. Field of the Invention

The present invention relates to a video signal recording apparatus for recording a video signal.

2. Description of the Related Art

In general, in a video signal recording apparatus which applies high efficiency encoding to a digital video signal, the high-efficiency encoding is performed only on the data representing an active video area of an input video signal. The encoded data is recorded on a magnetic tape along with video auxiliary data, e.g., information data representing various kinds of information such as an identification signal and character information for an input video signal.

FIG. 10 is a block diagram for a conventional video signal recording apparatus. In FIG. 10, the reference numeral 1001 denotes a video input terminal for inputting a video signal therethrough; 1002 denotes an information input terminal for inputting therethrough video auxiliary data of the input video signal; 1003 denotes an active video area encoder for performing high-efficiency encoding only on the active video area of the input video signal; 1004 denotes a recorder for recording the high-efficiency encoded data and the video auxiliary data; and 1005 denotes a magnetic tape.

The operation of the video signal recording apparatus having such a configuration will be described. A video signal is input through the video input terminal 1001; only the data representing the active video area of the input video signal is high-efficiency encoded by the active video area encoder 1003 and output to the recorder 1004; and the recorder 1004 records the video auxiliary data input through the information input terminal 1002 and the high-efficiency encoded data output from the active video area encoder 1003 on the magnetic tape 1005.

However, according to the above-described conventional technologies, if the number of active effective lines in an input video signal increases, than it is necessary to increase the number of tracks to be used for recording the data with an increased number of lines. Alternatively, if the same number of tracks is to be used for recording, then the compression rate is required to be increased. Therefore, a conventional video signal recording apparatus has a problem in that the apparatus cannot record the data with an increased number of lines without considerably changing the configuration thereof in any case.

SUMMARY OF THE INVENTION

According to the present invention, a video signal recording apparatus for recording a digital video signal on a plurality of tracks on a magnetic medium is provided. Each of the tracks has a video data region and an auxiliary data region. In the video signal recording apparatus, the digital video signal is recorded on at least a part of the auxiliary data region.

In one embodiment, the digital video signal recorded on at least a part of the auxiliary data region corresponds to data representing an additional video area other than an active video area.

In another embodiment, the video signal recording apparatus includes: a first encoder for receiving and high-efficiency encoding first data representing the active video area, thereby generating compressed first data; a second encoder for receiving and high-efficiency encoding second data representing the additional video area, thereby generating compressed second data; and a recorder for recording the compressed first data and the compressed second data on the magnetic medium.

In still another embodiment, the video signal recording apparatus includes: an encoder for receiving and high-efficiency encoding data representing the active video area and the additional video area, thereby generating compressed data; and a recorder for recording the compressed data on the magnetic medium.

In still another embodiment, the video signal recording apparatus includes: a first encoder for receiving and high-efficiency encoding first data representing the active video area, thereby generating compressed first data; and a recorder for recording the compressed first data and second data representing the additional video area on the magnetic medium.

In still another embodiment, the auxiliary data region is a region in which video auxiliary data is recorded.

Thus, the invention described herein makes possible the advantage of providing a video signal recording apparatus which can record the increased video area caused by the increases of the active line and be realized by slight modification of a conventional video recording apparatus.

This and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative examples with reference to the accom-

EXAMPLE 1

Figure 1:
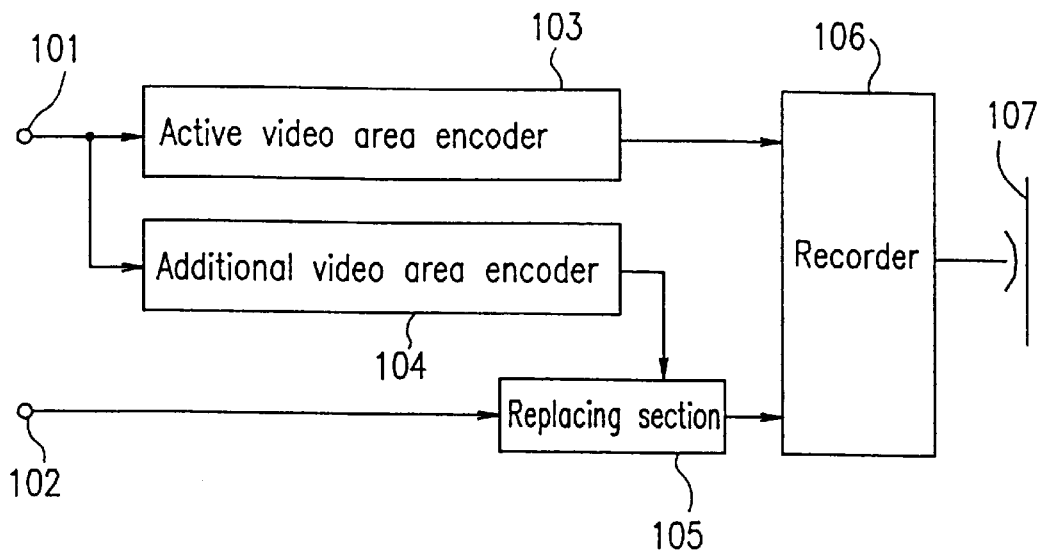
FIG. 1 is a block diagram for a video signal recording apparatus in a first example according to the present invention.

FIG. 1 is a block diagram for a video signal recording apparatus in a first example according to the present invention. A video signal input terminal 101 receives a digital video signal. This video signal is a digital signal representing pixels for composing a frame or a field, e.g., a 4:2:2 component signal complying with the ITU-R Rec. 601 standard.

An active video area encoder 103 receives data representing an active video area of the digital video signal input through the video signal input terminal 101 and then performs high-efficiency encoding thereon. Herein, an "active video area" refers to a region where an image is actually displayed on the screen of a display device. For example, this active video area is defined in by the standard for digital video cassette recorders in the "Specifications of Consumer-Use Digital VCRs" (hereinafter, these specifications will be referred to as a "consumer-use digital VCR standard" for simplification), part II, HD Digital VCR Conference, December 1994 as follows: in a "525/60 System", the active video area consists of a first field ranging from the 23rd line to the 262nd line (i.e., 240 lines in total), and a second field ranging from the 285th line to the 524th line, (i.e., 240 lines in total). In this specification, this 525/60 System will be illustrated as an example. However, the present invention is applicable not only to the 525/60 System but also to a "625/50 System". In the latter case, an active video area consists of a first field ranging from the 23rd line to the 310th line (i.e., 288 lines in total), and a second field ranging from the 335th line to the 622nd line (i.e., 288 lines in total). It is noted that the number of horizontal pixels is 720 in either system.

An additional video area encoder 104 receives data representing the pixels in an area other than the active video area (in this specification, the former area will be called an "additional video area") of the digital video signal input through the video signal input terminal 101 and then performs high-efficiency encoding thereon. The additional video area lies in the region excluding the active video area described above, and is an area represented by the lines other than the lines corresponding to a vertical blanking period. The number of lines corresponding to the vertical blanking period is different from each other among various standards. For example, the lines defined by the CCIR Rec. 656 standard are as follows: in the 525/60 System, the additional video area lies in the lines 1 to 10 and the lines 264 to 273 (i.e., 20 lines in total), whereas in the 625/50 System, the additional video area lies in the lines 1 to 23, the lines 311 to 336 and the lines 624 to 625 (i.e., 51 lines in total).

Figure 2:
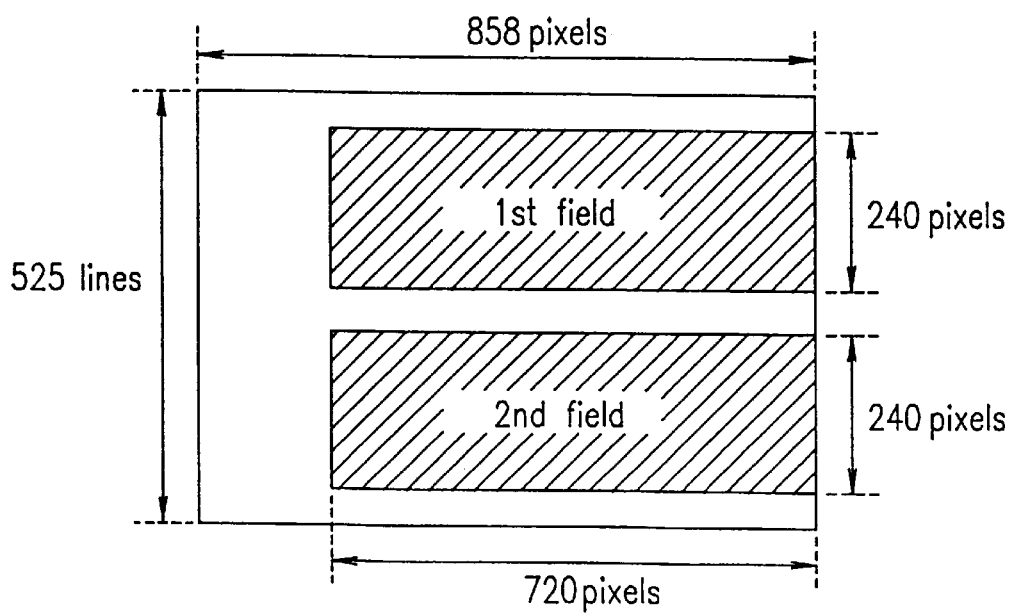
FIG. 2 is a schematic representation illustrating a first field and a second field in a 525/60 System.

FIG. 2 is a schematic representation showing the first field and the second field in the 525/60 System. In the 525/60 System, the first field and the second field are the active video areas.

A scheme for the high-efficiency encoding performed by the active video area encoder 103 and the additional video area encoder 104 is an intra-frame encoding, whereby data can be compressed to about ⅕.

A video auxiliary data input terminal 102 receives digital video auxiliary data. This video auxiliary data is the digital data other that the video signal, e.g., video auxiliary data (VAUX) defined by the consumer-use digital VTR standard described above. According to this standard, the video auxiliary data VAUX includes a vertical interval time code (VITC) and various information about the recorded video signal. The information about the video signal includes: the channel of a television broadcast to be recorded; the type of color frames; whether a 525/60 System or a 625/50 System is used; a recording mode; the aspect ratio of a screen; whether an interlaced scanning or a progressive scanning is performed; a recording date; a recording time; etc.

A replacing section 105 replaces the video auxiliary data input through the video auxiliary data input terminal 102 by the data representing the additional video area. It is obvious to those skilled in the art that the replacing section 105 can be formed of a memory and a memory controller for controlling the memory, for example.

A recorder 106 receives the high-efficiency encoded digital data which represents the active video area and has been output from the active video area encoder 103 and the high-efficiency encoded digital data which represents the additional video area and has been output from the replacing section 105; generates a signal suitable for being recorded on a magnetic tape 107; and then records the generated signal on the magnetic tape 107. The recorder 106 includes a function block for performing addition of an error correction code (ECC), shuffling, equalizing and the like for the input digital data and a magnetic head for writing the data on the magnetic tape 107.

In the examples of the present specification, the magnetic tape 107 is a tape with a width of 6.35 mm to be used for a consumer-use digital VTR.

Figure 3A:
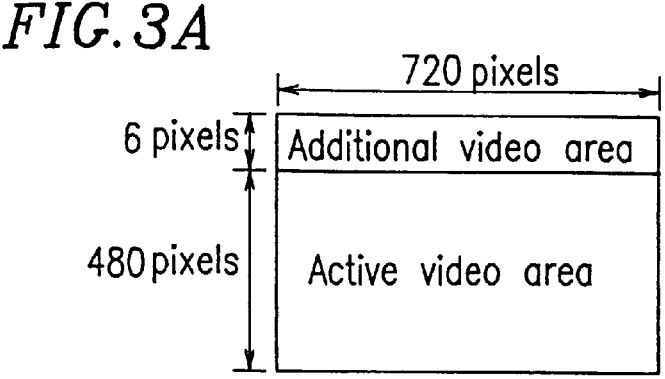
FIGS. 3A and 3B are schematic representations illustrating an active video area and an additional video area represented by an input video signal and macroblocks corresponding to these areas, respectively.
Figure 3B:
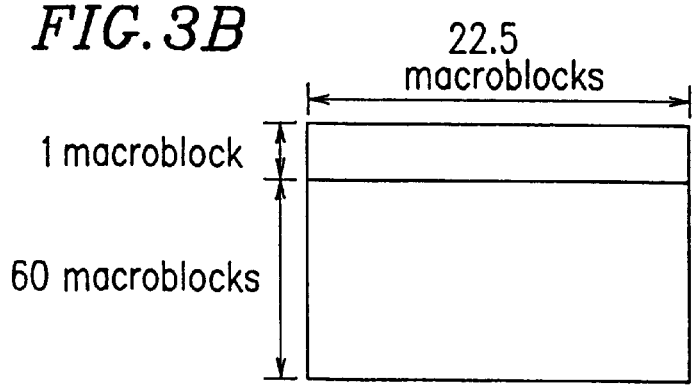

Hereinafter, the operation of the video signal recording apparatus shown in FIG. 1 will be described. FIGS. 3A and 3B are schematic representations showing an active video area and an additional video area represented by an input video signal and macroblocks corresponding to these areas, respectively. In this specification, the digital video signal input to the video signal input terminal 101 consists of an active video area composed of 720 horizontal pixels×480 vertical pixels and an additional video area composed of 720 horizontal pixels×6 vertical pixels, as shown in FIG. 3A.

The active video area encoder 103 receives a digital video signal representing the entire video areas, i.e., both the active video area and the additional video area; selectively performs a high-efficiency encoding only for the data representing the active video area; and then outputs the encoded data to the recorder 106. On the other hand, the additional video area encoder 104 receives a digital video signal representing the entire video areas, i.e., both the active area and the additional video area; selectively performs a high-efficiency encoding only for the data representing the additional video area; and then outputs the encoded data to the replacing section 105. Such selective high-efficiency encoding of the data representing a particular area is realized in the following manner. First, input data streams are once stored sequentially in a buffer memory. Then, by retrieving the data stored in a predetermined memory area only, only a part of the input data can be transferred to a block for performing the high-efficiency encoding therein.

The active video area encoder 103 performs the high-efficiency encoding for the area composed of 720 horizontal pixels×480 vertical pixels on a macroblock basis. Herein, one macroblock is composed of 32 horizontal pixels×8 vertical pixels. Therefore, as shown in FIG. 3B, the active video area is divided into 1350 macroblocks (i.e., 22.5 horizontal macroblocks×60 vertical macroblocks), and then high-efficiency encoded to be output to the recorder 106.

The additional video area encoder 104 adds 2 lines of dummy data to the additional video area, shown in FIG. 3A, composed of 720 horizontal pixels×6 vertical pixels. Thus, the area composed of 22.5 horizontal macroblocks×1 vertical macroblock as shown in FIG. 3B is high-efficiency encoded, and then output to the recorder 106.

The replacing section 105 replaces at least a part of the data input through the video auxiliary data input terminal 102 by the data output from the additional video area encoder 104 and then outputs the data to the recorder 106. Herein, all the data input through the video auxiliary data input terminal 102 can be replaced by the data output from the additional video area encoder 104.

The recorder 106 receives the compressed data output from the active video area encoder 103 and the compressed data output from the replacing section 105; generates syncblocks to be recorded on the magnetic tape 107; and then records the blocks on the magnetic tape 107.

Figure 4:
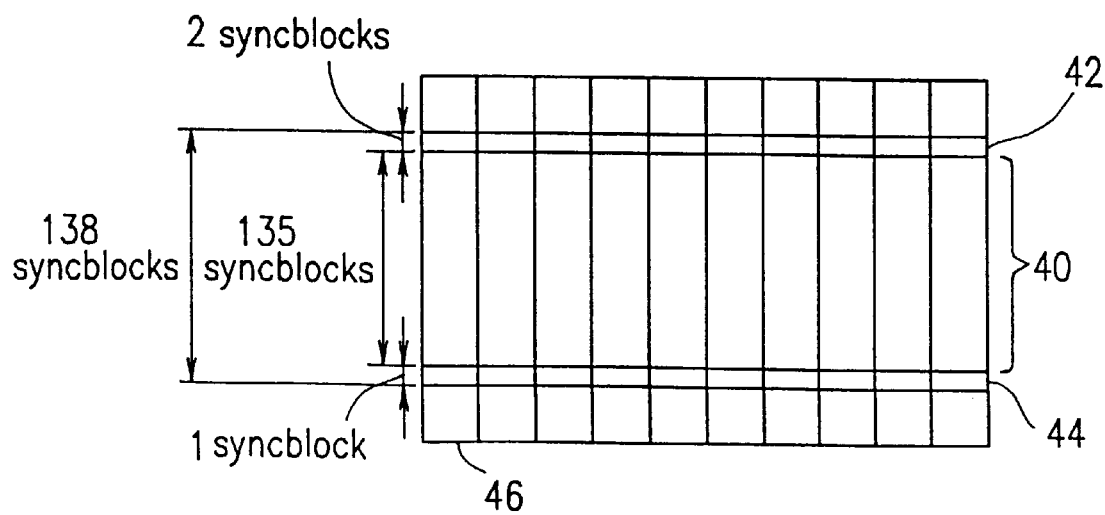
FIG. 4 is a schematic representation illustrating the tracks which correspond to the data in one frame and have been recorded on the magnetic tape 107, and the arrangement of the syncblocks.

FIG. 4 is a schematic representation showing the tracks which correspond to the data in one frame and have been recorded on the magnetic tape 107, and the arrangement of the syncblocks. Since a 525/60 System is herein illustrated as described above, the data corresponding to one frame is recorded on 10 tracks. Note that the data is recorded on 12 tracks in a 625/50 System.

On each track 46, the digital data is recorded in the form of 138 syncblocks. The 138 syncblocks existing on one track consist of 135 syncblocks for recording the video data (in a region 40) and 3 syncblocks for recording the video auxiliary data (VAUX) (in regions 42 and 44) according to the consumer-use digital VTR standard. Accordingly, the syncblocks recorded on the 10 tracks are classified into 1350 syncblocks for the video data and 30 syncblocks for the video auxiliary data.

Figure 5:
FIG. 5 is a schematic representation illustrating the arrangement of the sectors in a recording track on the magnetic tape 107.

FIG. 5 is a schematic representation showing the arrangement of the sectors in a recording track on the magnetic tape 107. Each of the tracks shown in FIG. 4 includes: an ITI sector (denoted by "ITI"); an audio sector (denoted by "AUDIO"); a video sector (denoted by "VIDEO"); and a sub-code sector (denoted by "SUB-CODE"), as shown in FIG. 5. The respective sectors are separated from each other by editing gaps G1 to G3. A margin for overwriting (denoted by "OM") is provided to be adjacent to the other end of the sub-code sector which is opposite to the end adjacent to the editing gap G3. In the ITI sector, tracking information during an insertion editing, and positional information of the respective sectors are recorded. The audio sector includes an audio data region, an audio auxiliary data (AAUX) region and the like. The video sector includes a video data region, a video auxiliary data (VAAUX) region and the like, as will be described later. In the sub-code sector, tape management information such as a time code complying with an SMPTE/ EBU standard is recorded.

Figure 6:
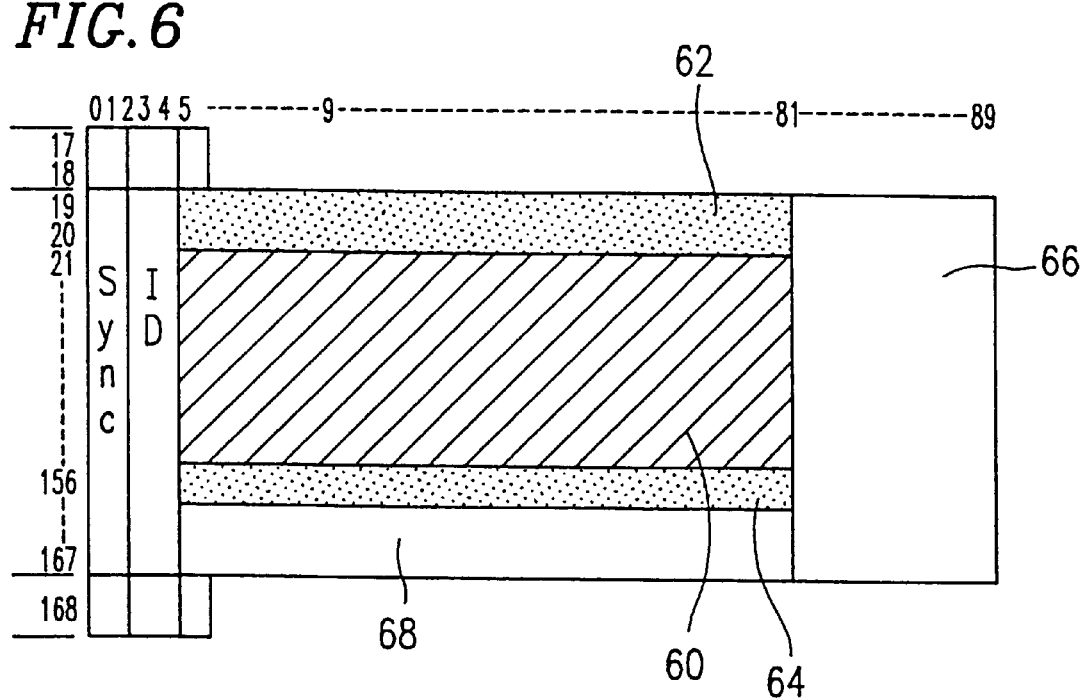
FIG. 6 is a schematic representation illustrating in more detail the video sector shown in FIG. 5.

FIG. 6 is a schematic representation showing in more detail the video sector shown in FIG. 5. The data shown in FIG. 6 is recorded in the video sector (or the region denoted by "VIDEO" in FIG. 5) on one track 46 shown in FIG. 4. In FIG. 6, the numbers assigned in the horizontal direction (i.e., the numbers 0 to 89) indicate the byte positions while the numbers assigned in the vertical direction (i.e., the numbers 17 to 168) indicate the syncblock numbers.

The 17th and the 18th syncblocks in FIG. 6 are presyncblocks and correspond to the region over the region 42 in FIG. 4. The 19th and the 20th syncblocks are syncblocks including the video auxiliary data 62 and correspond to the region 42 in FIG. 4. The 21st to the 155th syncblocks are syncblocks including the video data 60 and correspond to the region 40 in FIG. 4. The 156th syncblock is a syncblock including the video auxiliary data 64 and corresponds to the region 44 in FIG. 4. The 157th to the 168th syncblocks correspond to the region under the region 44 in FIG. 4. It is noted that an inner parity 66, an outer parity 68, a data Sync and a data ID are added to the video data 60, the video auxiliary data 62 and 64.

In the first example, the 1350 macroblocks representing the active video area are recorded in the video data region 60 as 1350 syncblocks, and the 22.5 macroblocks representing the additional video area are recorded in the video auxiliary data regions 62 and 64. Since 30 macroblocks can be originally recorded in the video auxiliary data regions 62 and 64, a region corresponding to 7.5 macroblocks is left. Any arbitrary data demanded by a user can be selected from various video auxiliary data and then recorded in this remaining region.

Therefore, according to the present invention, in the case where it becomes necessary to record information which is included not in the active video area but in the additional video area, such a recording operation is realized by the same components as those of a conventional recording apparatus without increasing the size of a circuit. For example, the present invention realizes an advantage of recording a video signal complying with a studio-use standard by using a consumer-use VTR, because the active video area of a video signal complying with a studio-use standard is larger than the area which can be recorded by a conventional consumer-use VTR by 6 lines, for example.

The video auxiliary data regions 62 and 64 are located to be adjacent to the video data region 60. In the first example, such a data arrangement makes it possible to record and reproduce data onto/from a tape in a simple circuit configuration. Note that one macroblock corresponds to one syncblock and the data corresponding to one macroblock is compressed to be recorded as one syncblock on the tape.

However, according to the present invention, the data representing the additional video area can be recorded in a region other than the video auxiliary data regions. In other words, according to the present invention, if the recording region other than the video data region or the region including the ITI sector, the audio sector, the sub-code sector and the like is called an "auxiliary data region", then it would be understood that the data representing the additional video area may be recorded in the auxiliary data region.

In the video signal recording apparatus in the first example according to the present invention, the data representing the additional video area is recorded in the video auxiliary data region on the magnetic tape. As a result, a frame composed of a larger number of lines can be recorded by using a recording apparatus having a similar configuration to that of a conventional recording apparatus.

It is noted that the format for an input video signal is not limited to that of the 4:2:2 video signal described above. For example, an input video signal may be a high-definition television signal or a sequential scanning signal.

Furthermore, a different encoding scheme can also be used for the active video area encoder 103 and the additional video area encoder 104.

EXAMPLE 2

Figure 7:
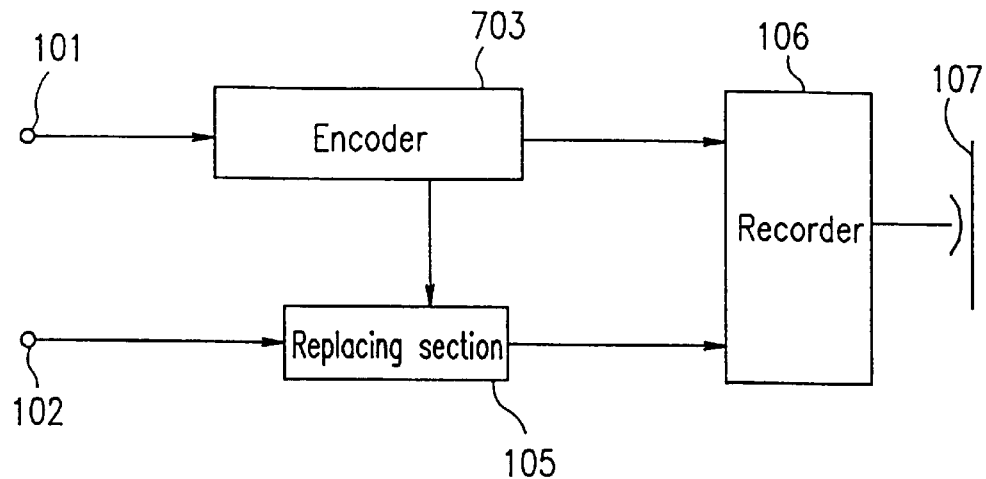
FIG. 7 is a block diagram for a video signal recording apparatus in a second example according to the present invention.

FIG. 7 is a block diagram for a video signal recording apparatus in a second example according to the present invention. The apparatus of the second example has the same configuration as that of the apparatus of the first example except that an encoder 703 functions as the active video area encoder 103 and the additional video area encoder 104. Therefore, a detailed description of the same components as those of the first example will be omitted herein.

The encoder 703 receives data represented by a frame composed of the active video area and the additional video area shown in FIG. 3A through the video signal input terminal 101. The encoder 703 divides this data into 1372.5 macroblocks and then performs high-efficiency encoding thereon. The encoder 703 selectively outputs the data, corresponding to the active video area, of the compressed data to the recorder 106 and outputs the data corresponding to the additional video area to the replacing section 105.

In the same manner as in the first example, 1350 macroblocks representing the active video area are recorded on the video data region as 1350 syncblocks, while 22.5 macroblocks representing the additional video area are recorded on a part of the video auxiliary data region in which 30 syncblocks can be recorded.

Since the two encoders of the first example are integrated in the second example, not only are the effects exhibited by the first example but also an effect about the reduction of the circuit size can be attained in the second example.

It is noted that, like in the first example, another format can be used for the input video signal.

EXAMPLE 3

Figure 8:
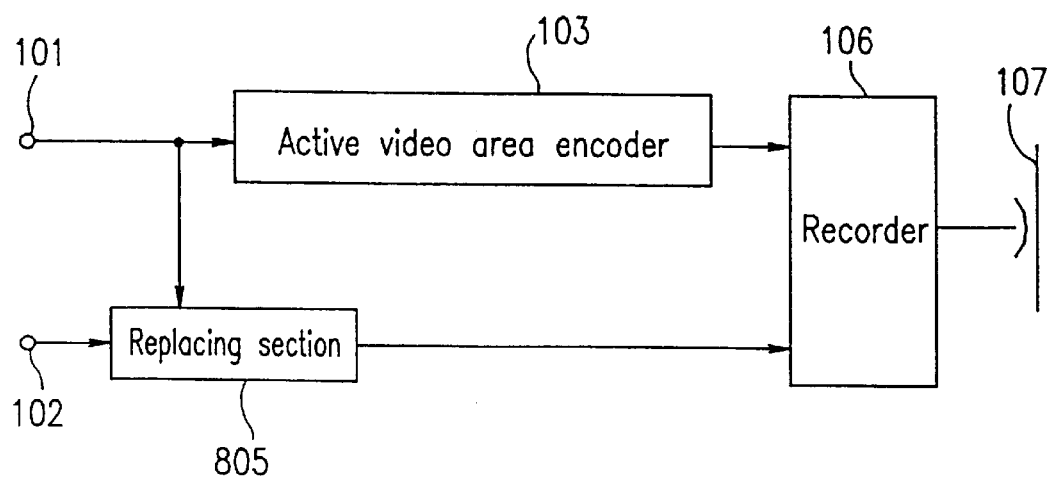
FIG. 8 is a block diagram for a video signal recording apparatus in a third example according to the present invention.

FIG. 8 is a block diagram for a video signal recording apparatus in a third example according to the present invention. The apparatus of the third example has the same configuration as the apparatus of the first example except that a replacing section 805 replaces the data representing the additional video area for which high-efficiency encoding is not performed by the video auxiliary data. Accordingly, only the component different from that of the first example will be described below.

The replacing section 805 receives the data representing the active video area and the additional video area through the video signal input terminal 101 and then replaces the video auxiliary data input to the video auxiliary data input terminal 102 with the data, representing the additional video area. The remaining operation performed by the recorder 106 and so on is similar to that of the first example.

In the third example, an encoder for high-efficiency encoding of the data representing the additional video area is not used. Therefore, the circuit size of the encoder can be advantageously reduced.

It is noted that another format, like in the first example, can be used for the input video signal.

Figure 9:
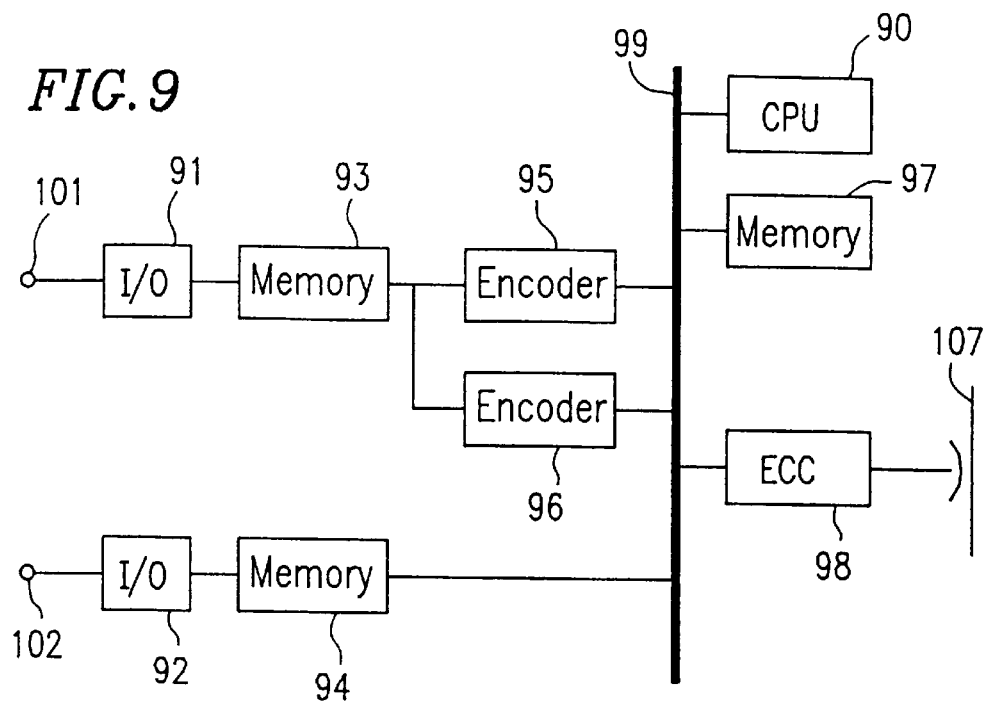
FIG. 9 is a diagram illustrating a method for implementing the video signal recording apparatus according to the present invention.
Figure 10:
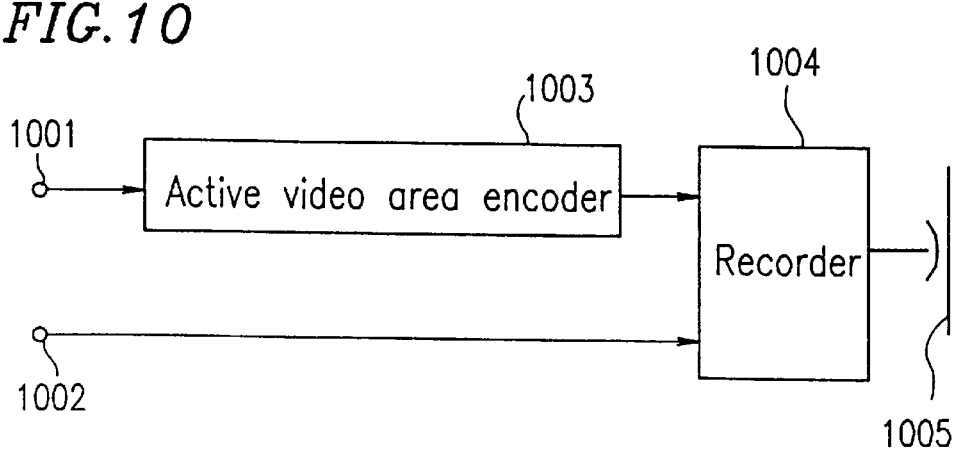
FIG. 10 is a block diagram for a conventional video signal recording apparatus.

Hereinafter, a method for actually implementing the video signal recording apparatus in the first to the third examples will be described. FIG. 9 is a diagram illustrating a method for implementing the video signal recording apparatus according to the present invention. First, a method for implementing the video signal recording apparatus of the first example by utilizing the configuration shown in FIG. 9 will be described. A CPU 90 controls not only the flow of the video data via a data bus 99 but also the respective components. An I/O unit 91 receives the data representing the active video area and the data representing the additional video area and outputs these data to a memory 93. The memory 93 receives the data representing the active video area and the data representing the additional video area and stores these data therein. Encoders 95 and 96 retrieve the data representing the active video area and the data representing the additional video area, respectively, from the memory 93 and then encodes these data. An I/O unit 92 receives the video auxiliary data and outputs the data to a memory 94.

First, the CPU 90 controls the encoder 95 and the memory 97 such that the data representing the active video area is written into the memory 97 via the data bus 99. Next, the CPU 90 controls the memories 94 and 97 such that the video auxiliary data is written into the remaining space of the memory 97 via the data bus 99. Finally, the CPU 90 overwrites the data which represents the additional video area and has been output from the encoder 96 onto a part of the video auxiliary data which is stored in the memory space to be replaced.

An ECC 98 selects any of the data representing the active video area, the data representing the additional video area and the video auxiliary data and retrieves the selected data from the memory 97 as the data to be actually recorded; performs an addition of an error correction code and the like; and then records the data on the magnetic tape 107.

In the second example, either one of the encoders 95 and 96 is used rather than using both. In the third example, the encoder 96 is bypassed, whereby the data representing the additional video area is output to the data bus 99 without performing high-efficiency encoding thereon. As described above, the first to the third examples can be flexibly implemented by utilizing the one and the same circuit configuration shown in FIG. 9.

In the foregoing examples, the data representing the additional video area is recorded in the video auxiliary data region. However, the present invention is not limited thereto. Alternatively, the data representing the additional video area may be recorded in the video data region, while the date representing the active video area may be recorded in the entire video auxiliary data region.

The video signal recording apparatus according to the present invention can attain at least the following effect. Specifically, although the video signal recording apparatus of the invention has a similar configuration to that of a conventional video signal recording apparatus, the video signal recording apparatus of the invention can record data representing a frame, composed of a larger number of lines than that of a conventional frame, on a magnetic tape.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A video signal recording apparatus for recording a digital video signal on a plurality of tracks on a magnetic medium, each of the tracks representing a trace of a single recording head across the magnetic medium and having a video data region and an auxiliary data region, wherein the digital video signal includes first data representing pixels in a first region of a display device and second data representing pixels in a region of the display device, other than the first region, the first data of the digital video signal is recorded on the video data region, and the second data of the digital video signal is recorded on at least a part of the auxiliary data region;

the video signal recording apparatus comprising:

a first encoder for receiving and high-efficiency encoding the first data representing pixels in the first region, thereby generating compressed first data;

a recorder for recording the compressed first data and the second data on the magnetic medium, and a replacing circuit coupled to the recorder, the replacing circuit receiving the second data and an auxiliary signal, the auxiliary signal including third data which contains information related to the first data and the second data in the digital video signal, wherein, upon receiving the second data, the replacing circuit replaces at least a first part of the third data corresponding to the auxiliary signal with the second data and provides the second data and a second part of the third data which is not replaced with the second data to the recorder for recording on the recording medium, and the recorder further records the second part of the third data which is not replaced with the second data by the replacing circuit.

2. A video signal recording apparatus according to claim 1, further comprising:

a second encoder for receiving and high-efficiency encoding the second data representing an additional video area, thereby generating compressed second data;

wherein the replacing circuit receives the compressed second data from the second encoder, and replaces at least the first part of the third data corresponding to the auxiliary signal with the compressed second data and provides the compressed second data and the second part of the third data which is not replaced with the compressed second data to the recorder for recording on the recording medium.

3. A video signal recording apparatus according to claim 1, wherein the replacing circuit receives the non-compressed second data, and replaces at least the first part of the third data corresponding to the auxiliary signal with the non-compressed second data and provides the non-compressed second data and the second part of the third data which is not replaced with the non-compressed second data to the recorder for recording on the recording medium.

4. A video signal recording apparatus according to claim 1, wherein the first encoder further receives the second data representing an additional video area, thereby generating compressed second data;

the recorder further records the compressed second data on the magnetic medium, and the replacing circuit further receives the compressed second data;

wherein, upon receiving the compressed second data, the replacing circuit replaces at least the first part of the third data with the compressed second data and provides the compressed second data and the second part of the third data which is not replaced with the compressed second data to the recorder.

5. A video signal recording apparatus according to claim 2, wherein the auxiliary data region is a region in which video auxiliary data is recorded.

6. A video signal recording apparatus according to claim 3, wherein the auxiliary data region is a region in which video auxiliary data is recorded.

7. A video signal recording apparatus according to claim 4, wherein the auxiliary data region is a region in which video auxiliary data is recorded.

8. A video signal recording apparatus for recording at least a first digital video and a second digital video signal on a plurality of tracks on a magnetic medium, each of the tracks representing a trace of a single recording head across the magnetic medium and having a video data region and an auxiliary data region, the apparatus comprising:

means for receiving and high-efficiency encoding the first video signal, thereby generating a compressed first video signal, means for recording the first video signal and a first portion of the second video signal within the video data regions, a replacing circuit coupled to the recording means, the replacing circuit receiving the second video signal and an auxiliary signal which contains information related to the first video signal and the second video signal, wherein, upon receiving the second video signal, the replacing circuit replaces the auxiliary signal with the second video signal and provides the second video signal to the recording means for recording on the recording medium, and said means for recording further including means for recording video auxiliary data relating to the first video signal and a second portion of the second video signal, within the auxiliary data regions to an exclusion of video auxiliary data relating to the second video signal, wherein the first video signal comprises M lines per frame and the second video signal comprises N lines per frame, where N is greater than M.

9. The apparatus of claim 8, wherein the second portion of the second video signal comprises N–M lines.

10. The apparatus of claim 8, wherein the first video signal and the first portion of the second video signal are recorded within the video data regions at an equal compression rate.

* * * * *